United States Patent Office 2,729,649
Patented Jan. 3, 1956

2,729,649
METHOD OF PREPARING SULFONIUM COMPOUNDS

Bruno Böttcher and Fritz L. Bauer, Kronach, Franconia, Germany

No Drawing. Application April 13, 1951,
Serial No. 220,978

1 Claim. (Cl. 260—327)

This invention relates to the preparation of novel sulfonium compounds, and more particularly to the preparation of sulfonium compounds from molecules containing a thioketo-group which is not subject to enolization.

Sulfonium compounds such as the alkyl halide derivatives of 5-thion-1,2-dithioles exhibit disinfectant properties. Such an alkyl halide compound of a 5-thion-3-(p-methoxy-phenyl)-1,2-dithiole is described in Swiss Patent Number 232,596. Said 5-thione-3-(p-methoxy phenyl)-1,2-dithiol corresponds to the following formula:

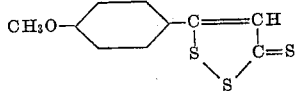

This compound reacts with methyl iodide to form the corresponding quaternary compound having the following formula:

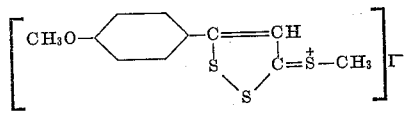

Esters of toluene sulfonic acid add to said thioketo compounds in a manner similar to methyl iodide. Thioketo-groups in sulphur containing heterocyclic compounds show addition of halogen alkyls, dialkyl sulfates, and like substances.

We have discovered that sulfonium derivatives having a thioketo-group incapable of enolization may be reacted with organic metal compounds, e. g. alkali metal salts of organic acids. Organic alkaline earth compounds may be used in lieu of the alkali metal salts.

The sulfonium compound, for example the dimethyl sulfate of 5 - thion - 3 - (p-methoxy-phenyl)-1,3-dithiol is readily soluble in water, or in an organic solvent such as alcohol. Next a metal salt of an organic acid or of an organic compound capable of forming metal salts is added to this solution, either as the solid salt or as a solution thereof. The reaction product possess surprising therapeutic properties.

A thioketo-group not capable of enolization is a C=S group which is not liable to be transformed to an SH group by movement of a hydrogen atom with simultaneous change of position of the double bond. An example of a compound having a thioketo-group which exhibits enolization is 2-thioquinoline:

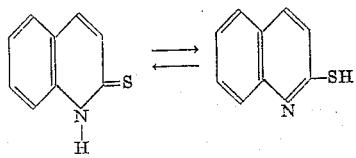

Whereas an example of a thioketo-group not capable of enolization is N-methyl-2-thioquinoline, having the formula:

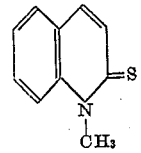

Examples of other thioketo compounds not capable of enolization are:

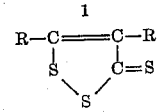
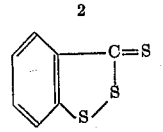
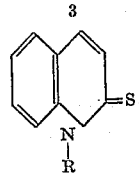

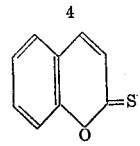
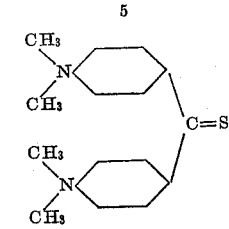

We prefer to use hydrophylic solvents such as water, aliphatic alcohols, pyridine, and the like for dissolving the component compounds, which solutions are then mixed to give a reaction product. The product is allowed to crystallize, or the reaction product is subject to evaporation in vacuo of part of the solvent. The temperature of reaction is variable as is also the pressure, but preferably the reaction is carried out at room temperature and normal pressure.

Example I

An aqueous solution of sodium salicylate is prepared by dissolving 2.8 gms. of the dimethyl sulfate derivative of salicylic acid in a solution consisting of 20 cc. of three normal sodium hydroxide diluted with 200 cc. of water. This solution of sodium salicylate is reacted with a solution consisting of 8 gms. of 5-thion-3-(p-methoxy-phenyl)-1,2-dithiol dissolved in 200 cc. of water. The reaction product is a thick yellow slurry of crystals, which are separated from excess liquid by means of suction, and then dried in a desiccator. A dilution of 1 to 10,000 thoroughly suppresses the growth of staphylococci and streptococci, while a dilution of 1 to 100,000 stops such growth to a large extent.

This compound has the probable formula:

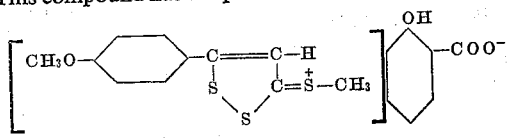

Example II

To a solution of 10 cc. of normal sodium hydroxide diluted with 25 cc. of water, there is added 2.55 gms. of 1,2,5-sulfosalicylic acid. Next there is added a solution consisting of 4 gms. of the dimethyl sulfate derivative of 5-thion-3-(p-methoxy-phenyl)-1,2-dithiol dissolved in 100 cc. of water. Upon standing, yellow crystals form, which then are filtered off with the aid of suction. The crystals are then washed with water and dried in a desiccator. The product is difficultly soluble in water and organic solvents. It melts under decomposition between 225 and 227° C. The product thoroughly suppresses staphylococci and streptococci in vitro at a dilution of 1 to 10,000 and stops their growth to a large extent in a dilution of 1 to 100,000. The product is not an intoxicant to mice. The formula of the product probably is:

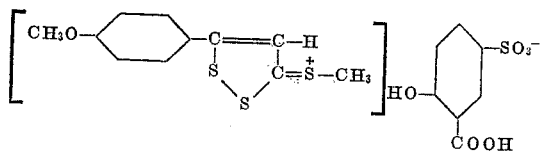

Example III

A solution of sodium hydroxide is prepared by dissolving 0.6 gm. of NaOH in 60 cc. of water, to which there is added 3.8 gms. of 1,2,5-sulfosalicylic acid. Another solution consisting of 5 gms. of the dimethyl sulfate derivative of 5-thion-1,2-dithiol and 60 cc. of water is prepared. These two solutions are mixed and a yellow crystalline product is precipitated. This product is filtered off, sucked free of liquid, washed with water and dried in a desiccator. The product thoroughly suppresses staphylococci and streptococci in a dilution of 1 to 10,000 and inhibits their growth to a large extent in a dilution of 1 to 100,000; and is not an intoxicant to mice.

This product has the probable formula:

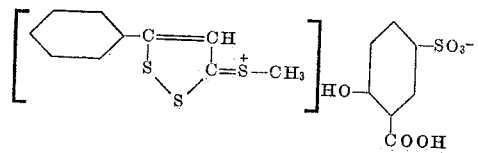

Example IV

To a solution of sodium hydroxide, prepared from 5 cc. of normal NaOH and 10 cc. of water, there is added 1.1 gms. of 1,2,5-sulfosalicylic acid. To this above solution there is added a solution consisting of 1.65 gms. of the dimethylsulfate derivative of 5-thion-3-furyl-1,2-dithiol dissolved in 80 cc. of water. Upon distillation of the water from the reaction product, a precipitate of yellow-brown crystals is obtained. These crystals are sucked free of liquid and dried in a desiccator. The product thoroughly suppresses in vitro the growth of staphylococci and streptococci in a dilution of 1 to 10,000 and stops their growth to a large extent in a dilution of 1 to 100,000 and is not an intoxicant. The product has the probable formula:

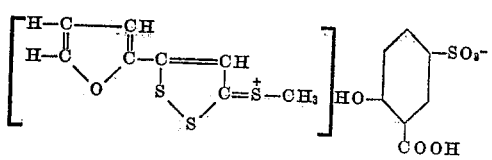

Example V

To a solution of 2 cc. of normal NaOH in 20 cc. of water there is added 0.5 gm. of 1-hydroxy-2-aminophenyl-4-arsenic-oxide as the hydrochloride salt. To the above solution is added a solution consisting of 0.8 gm. of the dimethylsulfate derivative of 5-thion-3-(p-methoxy-phenyl)-1,2-dithiol. A brown product was precipitated which was filtered off by means of suction, washed with water and dried in a desiccator. It is difficultly soluble in water and organic solvents. M. P. 177 to 178° C. This product thoroughly suppresses in vitro the growth of staphylococci and streptococci in a dilution of 1 to 10,000 and stops their growth to a large extent in a dilution of 1 to 500,000 and is not an intoxicant to a mouse which was fed 10 mg. by mouth. The product has the probable formula:

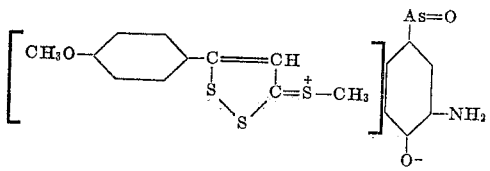

Example VI

To a solution of 0.6 gm. of NaOH in 100 cc. of absolute alcohol there is added 2 gms. of thiourea. A 50 cc. portion of the above solution was then diluted with 50 cc. of absolute alcohol and to this solution there was added a solution consisting of 3.5 gms. of the dimethyl sulfate derivative of 5-thion-3-(p-methoxy-phenyl)-1,2-dithiol dissolved in 100 cc. of water. An oily product was obtained which became crystalline on standing. Addition of 100 cc. of water produces further precipitate of the same crystals. These crystals were then sucked free of liquid, washed with water and dried in a desiccator. This product thoroughly suppresses in vitro the growth of staphylococci and streptococci and stops their growth even at a dilution of 1 to 100,000. A mouse can take up to 7.5 mg. by mouth without intoxication. This crystalline product has the probable formula:

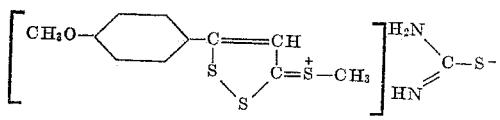

Example VII

To a solution of 4.5 gms. of the hydrochloride of Salvarsan (3,3' - diamino - 4,4' - di-sodium-oxy-arseno-benzene) in 100 cc. of water, there is added a solution of 3.5 gms. of the dimethylsulfate derivative of 5-thion-3-(p-methoxy-phenyl)-1,2-dithiol. A brown precipitate formed which was sucked free from liquid and washed with a large amount of water. The product thoroughly suppressed in vitro the growth of staphylococci and streptococci in a dilution of 1 to 80,000 and a mouse could ingest 10 mg. by mouth without intoxication. The product has the probable formula:

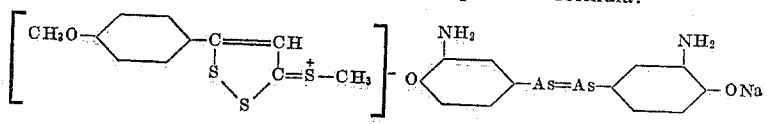

The free base of this product is also a brown powder, difficultly soluble in water and organic solvents; it melts under decomposition above 200° C.

Example VIII

To a solution of 10 cc. of normal NaOH in 100 cc. of water, there is added 4.6 gms. of the compound having the formula:

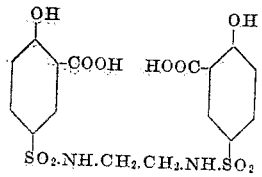

To the above resulting solution there is added a solution consisting of 4 gms. of the dimethyl sulfate derivative of 5 - thion-3-(p-methoxy-phenyl)-1,2-dithiol in 100 cc. of water. After standing for some hours a crystalline precipitate is obtained which was sucked free from liquid, washed with water and dried in a desiccator. This product thoroughly suppressed the growth of staphylococci and streptococci in a dilution of 1 to 100,000 and it was not toxic to mice. This product has the probable formula:

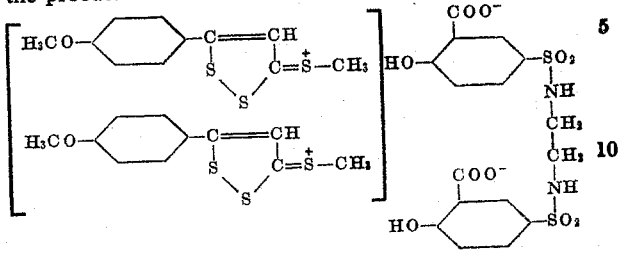

Example IX

To a solution of 10 cc. of normal NaOH in 100 cc. of water there is added 3.5 gms. of the compound having the formula:

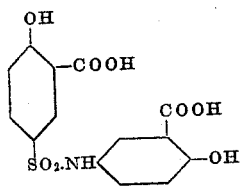

To the above resulting solution there is added a solution consisting of 4.9 gms. of the dimethyl sulfate derivative of 5-thion-3-(p-methoxy-phenyl)-1,2-dithiol and 100 cc. of water. A brown precipitate formed which was sucked free of liquid, washed with water and dried in a desiccator.

The product thoroughly suppressed the growth of staphylococci and streptococci in vitro at a dilution of 1 to 10,000 and stopped their growth even at a dilution of 1 to 100,000 and was not toxic to mice in 10 mg. quantities by mouth. The compound had the probable formula:

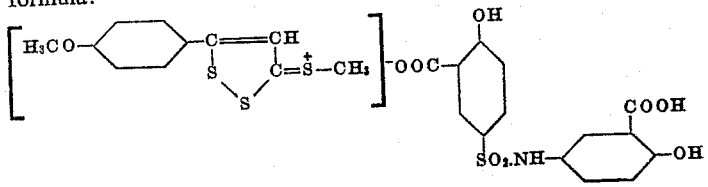

It is a brown powder, difficultly soluble in water and organic solvents. It decomposes above 200° C.

Example X

To an aqueous solution of N-methyl-2-thioquinoline there is added an aqueous solution of the dimethyl sulfate derivative of sodium salicylate in equimolecular quantity. Upon distillation of the water in vacuo a crystallization of the reaction product is effected. This product is filtered off, washed and dried in a desiccator. The product thoroughly suppresses the growth of staphylococci and streptococci in vitro in a dilution of 1 to 10,000. This product has the probable formula:

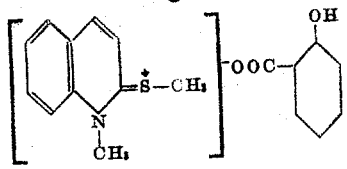

In forming the compounds of this invention, we use substances capable of forming salts, especially organic metal salts, for example, the alkali salts of salicylic acid and the alkali derivatives of organic arsenic compounds. Preferably these organic metal compounds are ionizable and water soluble and we prefer also to use water soluble sulfonium compounds such as 5-thion-1,2-dithiol.

This invention is described broadly and specifically, the latter by way of 10 examples. However, the scope of this invention is not to be limited to these 10 examples, since these are but illustrative embodiments of a generic or broad concept.

Example XI

A solution of 1.2 gms. succinic acid and 10 cc. of normal potassium hydroxide in 100 cc. water and a solution of 3.7 gms. of the dimethylsulfate derivative of 5-thion-3-(p-methoxy-phenyl)-1,2-dithiol in 300 cc. water is mixed and the mixture subjected to evaporation in vacuo of part of the solvent. The reaction product consists of yellow cristals which are dried in a desiccator. A dilution of 1:10,000 thoroughly suppresses in vitro the growth of staphylococci.

This compound has the probable formula:

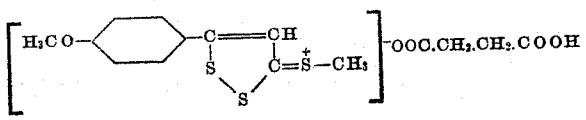

We claim:
A new complex sulfonium compound of the formula

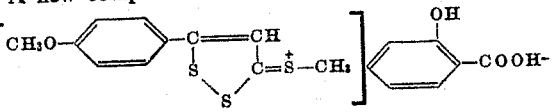

References Cited in the file of this patent

UNITED STATES PATENTS

| | | |
|---|---|---|
| 2,535,705 | Stevens et al. | Dec. 26, 1950 |
| 2,535,706 | Stevens et al. | Dec. 26, 1950 |

FOREIGN PATENTS

| | | |
|---|---|---|
| 901,102 | France | July 18, 1945 |